United States Patent
Yin et al.

(10) Patent No.: US 12,417,602 B2
(45) Date of Patent: Sep. 16, 2025

(54) TEXT-DRIVEN 3D OBJECT STYLIZATION USING NEURAL NETWORKS

(71) Applicant: Nvidia Corporation, Santa Clara, CA (US)

(72) Inventors: Kangxue Yin, Toronto (CA); Huan Ling, Toronto (CA); Masha Shugrina, Toronto (CA); Sameh Khamis, Alameda, CA (US); Sanja Fidler, Toronto (CA)

(73) Assignee: Nvidia Corporation, Santa Clara, CA (US)

( * ) Notice: Subject to any disclaimer, the term of this patent is extended or adjusted under 35 U.S.C. 154(b) by 212 days.

(21) Appl. No.: 18/174,863

(22) Filed: Feb. 27, 2023

(65) Prior Publication Data
US 2024/0290054 A1   Aug. 29, 2024

(51) Int. Cl.
| G06T 19/20 | (2011.01) |
| G06N 3/0475 | (2023.01) |
| G06N 3/08 | (2023.01) |
| G06T 15/04 | (2011.01) |
| G06T 15/10 | (2011.01) |

(52) U.S. Cl.
CPC .......... *G06T 19/20* (2013.01); *G06N 3/0475* (2023.01); *G06N 3/08* (2013.01); *G06T 15/04* (2013.01); *G06T 15/10* (2013.01); *G06T 2219/2021* (2013.01); *G06T 2219/2024* (2013.01)

(58) Field of Classification Search
None
See application file for complete search history.

(56) References Cited

U.S. PATENT DOCUMENTS

| 11,551,429 B2 | 1/2023 | Rong et al. |
| 2018/0068463 A1 | 3/2018 | Risser |
| 2018/0144535 A1 | 5/2018 | Ford et al. |
| 2018/0211373 A1 | 7/2018 | Stoppa et al. |
| 2019/0026958 A1 | 1/2019 | Gausebeck et al. |
| 2019/0060602 A1 | 2/2019 | Tran et al. |
| 2019/0122411 A1 | 4/2019 | Sachs et al. |
| 2020/0082249 A1 | 3/2020 | Hua et al. |

(Continued)

OTHER PUBLICATIONS

Yin et al., 3DStyleNet: Creating 3D Shapes With Geometric and Texture Style Variations, Proceedings of the IEEE/CVF International Conference on Computer Vision (ICCV), 2021, pp. 12456-12465 (Year: 2021).*

(Continued)

*Primary Examiner* — Kee M Tung
*Assistant Examiner* — Biao Chen
(74) *Attorney, Agent, or Firm* — Hogan Lovells US LLP

(57) ABSTRACT

Generation of three-dimensional (3D) object models may be challenging for users without a sufficient skill set for content creation and may also be resource intensive. One or more style transfer networks may be combined with a generative network to generate objects based on parameters associated with a textual input. An input including a 3D mesh and texture may be provided to a trained system along with a textual input that includes parameters for object generation. Features of the input object may be identified and then tuned in accordance with the textual input to generate a modified 3D object that includes a new texture along with one or more geometric adjustments.

18 Claims, 11 Drawing Sheets

(56) References Cited

U.S. PATENT DOCUMENTS

| | | | |
|---|---|---|---|
| 2020/0258223 | A1 | 8/2020 | Yip et al. |
| 2021/0065418 | A1 | 3/2021 | Han et al. |
| 2021/0073944 | A1 | 3/2021 | Liu et al. |
| 2021/0142577 | A1 | 5/2021 | Thomas et al. |
| 2021/0166380 | A1 | 6/2021 | Yip et al. |
| 2021/0209388 | A1 | 7/2021 | Ciftci et al. |
| 2021/0248762 | A1 | 8/2021 | Pfister et al. |
| 2021/0279950 | A1 | 9/2021 | Phalak |
| 2021/0279952 | A1* | 9/2021 | Chen ............... G06T 17/00 |
| 2021/0342669 | A1 | 11/2021 | Godwin, IV et al. |
| 2021/0383589 | A1 | 12/2021 | Risser |
| 2022/0026920 | A1 | 1/2022 | Ebrahimi Afrouzi et al. |
| 2022/0027672 | A1 | 1/2022 | Xu et al. |
| 2022/0076133 | A1 | 3/2022 | Yang et al. |

OTHER PUBLICATIONS

Tang et al., Neural Shape Deformation Priors, arXiv:2210.05616v2 [cs. CV] Feb. 1, 2023 (Year: 2023).*

Michel et al., Text2Mesh: Text-Driven Neural Stylization for Meshes, Proceedings of the IEEE/CVF Conference on Computer Vision and Pattern Recognition (CVPR), 2022, pp. 13492-13502 (Year: 2022).*

Non-Final Office Action issued in U.S. Appl. No. 17/467,792, dated Feb. 13, 2023.

Final Office Action issued in U.S. Appl. No. 17/467,792, dated Aug. 17, 2023.

Non-Final Office Action issued in U.S. Appl. No. 17/467,792, dated Jan. 2, 2024.

* cited by examiner

TEXT-DRIVEN 3D OBJECT STYLIZATION USING NEURAL NETWORKS

BACKGROUND

Three-dimensional (3D) object models may be used to generate and/or provide content for various applications, such as videos, interactive digital kiosks, animated media, video games, and others. Development of object models may be difficult, with creators often requiring significant levels of skill and the use of large amounts of time to generate realistic and/or impressive looking models and images rendered from those models. Additionally, models may not be used across different content without major modifications because different types of media may have different styles, and as a result, a pre-existing model may need significant refinement to generate content having a different style.

BRIEF DESCRIPTION OF THE DRAWINGS

Various embodiments in accordance with the present disclosure will be described with reference to the drawings, in which.

DETAILED DESCRIPTION

Approaches in accordance with various embodiments overcome these and other deficiencies by providing systems and methods for generating three-dimensional (3D) content that is stylized according to a textual input. Specifically, embodiments provide an improved system for generating 3D objects based on an input 3D shape with texture and a text input. The system may include two modules, a generative neural network, and a 3D stylization module. In one or more embodiments, the generative neural network may be implemented as a generative adversarial network, such as a camera-conditional generative adversarial network (ccGAN). Other suitable implementations for the generative neural network may include, without limitation, an autoencoder network, a transformer network, or a diffusion network. In at least one embodiment, the ccGAN is trained using a camera vector that may correspond to camera position, camera type, and/or the like. As a result, the trained ccGAN may generate 3D images of an object from a variety of different views. In at least one embodiment, the ccGAN is further used in combination with the 3D stylization module. The 3D stylization module may include features from one or more models used to create geometric and textural variations in 3D objects, such as 3DStyleNet and/or Text2Mesh, among other options. A first head (e.g., output or output terminal) of the 3D stylization module may be used for image style transfer, which may include features that correspond to a surface appearance. A second head may be used for local displacements, which may include features that correspond to surface texture, roughness, geometric details, bump maps, and/or the like. A third head may be used for global deformations, which may include features that correspond to an overall form and/or shape of object. Respective outputs from the three heads may be provided to a differentiable renderer to generate a variety of images of an input 3D shape that may be morphed or otherwise changed to correspond to the text input. In at least one embodiment, a pretrained language-vision model, such as contrastive language-image pre-training (CLIP), produces a joint embedding of image and text. Using CLIP, systems and methods may render result into images, obtain embeddings of the rendered images, and try to match the embedding of the input text. The system may be improved by evaluating different costs or losses, where the costs or losses may be tuned to provide more preference to the input 3D shape or to the text input. Costs or losses may include style costs or losses, content costs or losses, or CLIP costs or losses, as examples. Various embodiments enable production of novel 3D assets as stylization results.

Various other such functions can be used as well within the scope of the various embodiments as would be apparent to one of ordinary skill in the art in light of the teachings and suggestions contained herein.

Figure 1:
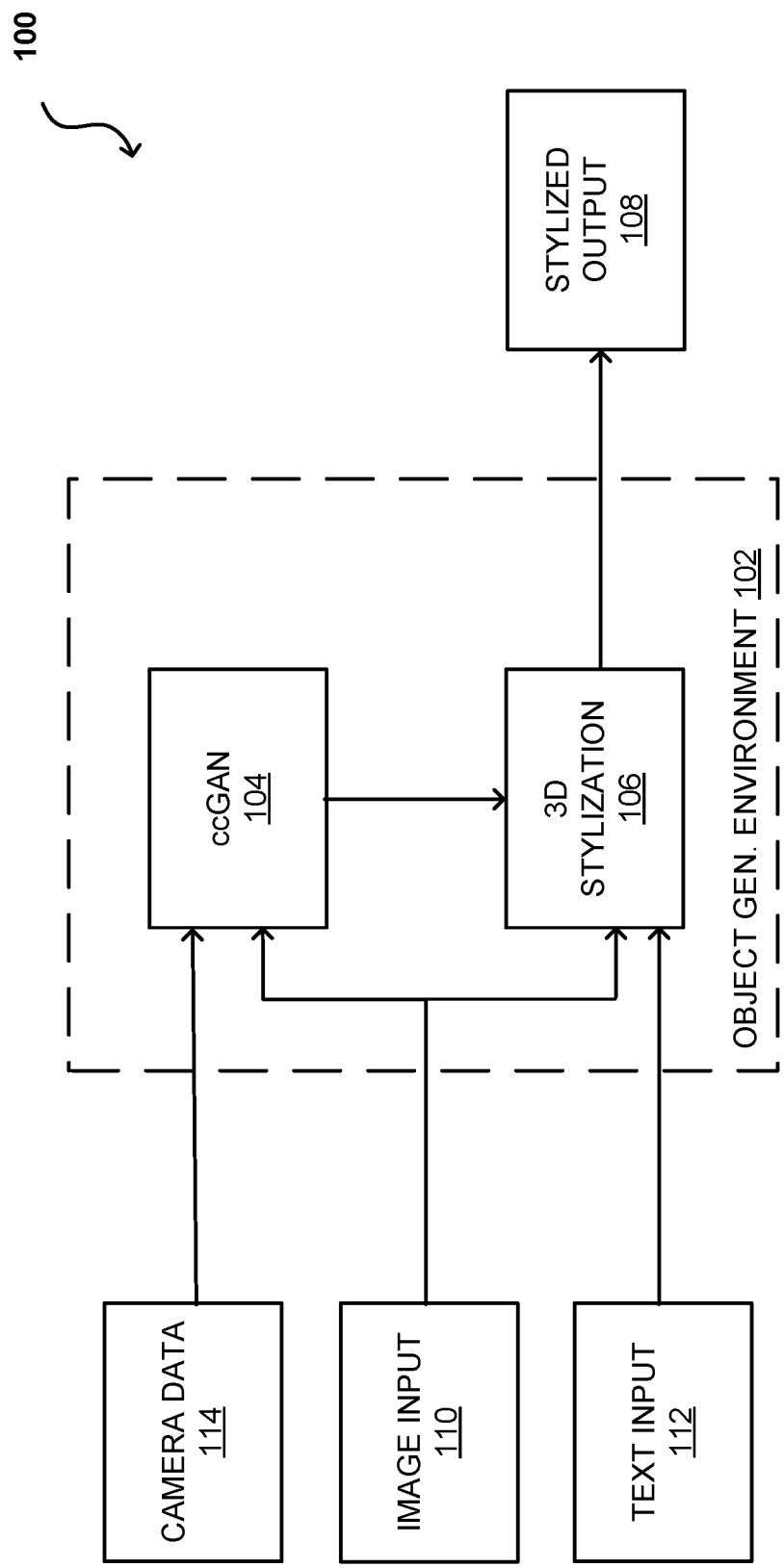
FIG. 1 illustrates a schematic diagram of an environment for content generation, according to at least one embodiment.

FIG. 1 illustrates an environment 100 which may be used to generate 3D objects in accordance with various embodiments. In this example, an object generation environment 102 includes a generative neural network, such as a generative adversarial network (e.g., ccGAN 104) and a 3D stylization module 106. As described herein, the ccGAN 104 may be used to guide or otherwise direct generation of a stylized output 108 based on an input image 110, which may include a 3D mesh with texture, and an input text 112. In various embodiments, camera data 114 corresponds to camera extrinsic information to enable generation of different 3D outputs from a variety of different view directions. Using the input camera data 114, the ccGAN 104 may include a viewpoint conditioned GAN which can be used to produce text-guided stylized multi-view images in combination with the 3D stylization module 106 to edit a 3D mesh and texture based on the stylized multi-view imagery.

In at least one embodiment, the image input 110 corresponds to a 3D object represented as a textured mesh. For example, the image input 110 may be an animal that has specific features, such as a head shape, a body shape, fur, fur color, and/or additional details. However, the generation and/or appearance of the stylized output 108 may be guided by the text input 112, which may include directions or information to control how the image input 110 is adjusted.

For example, the text input 112 may be associated with one or more features or styles, such as "zombie," to change the appearance of the object(s) or in the input image 110 to look like a zombified (e.g., decaying and undead) version(s) of the object(s). As another example, the text input 112 may be "cartoon dog" to adjust features of the input image 110 to correspond to those of a cartoon dog. In at least one embodiment, the joint image-language embedding space of CLIP may be used within the object generation environment 102. However, instead of stylizing local details and vertex colors, the shape and texture of the 3D object of the image input 110 is adjusted globally. For example, the ccGAN 102 may be trained to encode the identity of the 3D object within the image input 110 to its latent space and to disentangle camera views from the identity. Thereafter, the GAN can be finetuned with CLIP losses to produce stylized renderings for the input 3D objects. Embodiments may further preserve details and maintain view-consistency using the 3D stylization module 106 to directly stylize textured 3D meshes.

In at least one embodiment, the ccGAN 104 is used to generate and learn a prior over textured 3D objects. The ccGAN 104 includes a multi-view model in an image domain that learns distributions from rendered views of a 3D training set. The model may disentangle identity from camera view and may include one or more architectural components of StyleGAN2, among other potential network designs. The ccGAN 104 may be jointly trained with an encoder such that an input 3D object is converted into its latent code (w) representing its identity. Thereafter, the 3D object may be rendered from w and various arbitrary camera views using one or more generators (G). Various embodiments may train the ccGAN 104 on renderings of 3D training objects that include ground truth camera views. In at least one embodiment, camera intrinsics (e.g., focal length, skew, distortion, image center, etc.) may be simplified within this training set and one or more parameters may be fixed or otherwise defined for the ground truth. Furthermore, embodiments may incorporate sampling of a camera position uniformly over a sphere around a 3D object and setting a looking-at point to be a center of the object. As a result, a camera view (u) may be defined as a 3D vector encoding the 3D position of the camera. Posed renders of the 3D object may then be generated on the fly.

Various embodiments of the present disclosure may be used to generate 3D content for applications such as virtual reality (VR), augmented reality (AR), mixed reality (MR), virtual world simulations, games, film, television, animation, architectural or graphical modeling, and/or a variety of other media applications. With existing methods, generation of content may be time-consuming and often requires a requisite level of expertise in order to generate, render, and/or modify different 3D content objects. Various embodiments enable rapid generation of 3D objects using language queries to guide generation of new content based on an initial 3D input.

In at least one embodiment, systems and methods provide text-guided 3D stylization by using a combination of a 3D stylization module, generative neural network, and a language-vision model to provide global determinations and local perturbations to object shape, as well as to stylize object textures, to conform to a text input. The text input may be a user-provided text input. As shown in FIG. 1, the environment may include at least two modules, including the generative neural network that functions as a viewpoint-conditional image GAN which can produce text-guided stylized multi-view images using the language-vision model along with the 3D stylization module that edits a 3D mesh and texture for an object based on the stylized multi-view imagery. In at least one embodiment, geometry editing is both global, by deforming each part of the object in a consistent way, as well as local, by displacing vertices by small offsets.

Various embodiments are directed toward a text-driven stylization of 3D meshes, which may be provided along with texture within an image input. Systems and methods may deploy 3D stylization to jointly edit the style of both the geometry and texture of an object given a text input. One or more neural networks may be trained using a set of textured meshes to learn plausible shapes and texture distributions through a generative neural network. A 3D stylization module may then be trained on a single text prompt to directly output a stylization result at inference time without further test-time optimization.

In at least one embodiment, the environment 100 may be used to generate a 3D object given an initial image input of a 3D object represented as a textured mesh. The environment may stylize both the geometry and texture of the initial image input according to text provided by the user while maintaining the identity of the original shape. Systems and methods may, in one or more embodiments but without limitation, incorporate CLIP (or another language-vision model) to leverage a joint image-language embedding space and then stylize the shape of the 3D object globally. In at least one embodiment, stylization is confined to a space of valid 3D shapes and textures by first building a prior by training over a collection of 3D objects. Confining the stylization to the space may reduce or avoid degenerated solutions that could result from direct optimization of the mesh with CLIP losses.

The object generation environment 102 is used to constrain a CLIP-driven stylization to a valid domain using the ccGAN 104 to represent the identity of a 3D object in an intermediate latent space (w). The ccGAN may be trained on a set of texture shapes of one class (e.g., an animal). Provided with a text input, the system may then finetune the weights of a conditional generator (G) using one or more trained neural networks, such as StyleGAN-NADA, as one example. In at least one embodiment, the conditional generator may be tuned to develop a tuned conditional generator (G') to act as a stylizing renderer for a 3D input to output multi-view images in a desired style. Because the multi-view images may suffer from loss of geometric/textural details, as well as view inconsistencies, embodiments of the present disclosure further train a 3D stylization module under the guidance of the generative neural network generator. Once trained, the 3D stylization module directly stylizes the 3D meshes and their textures at inference time. Accordingly, systems and methods enable real-time stylization for a style implied in an input text at training time without additional 3D information to support that style.

Figure 2:
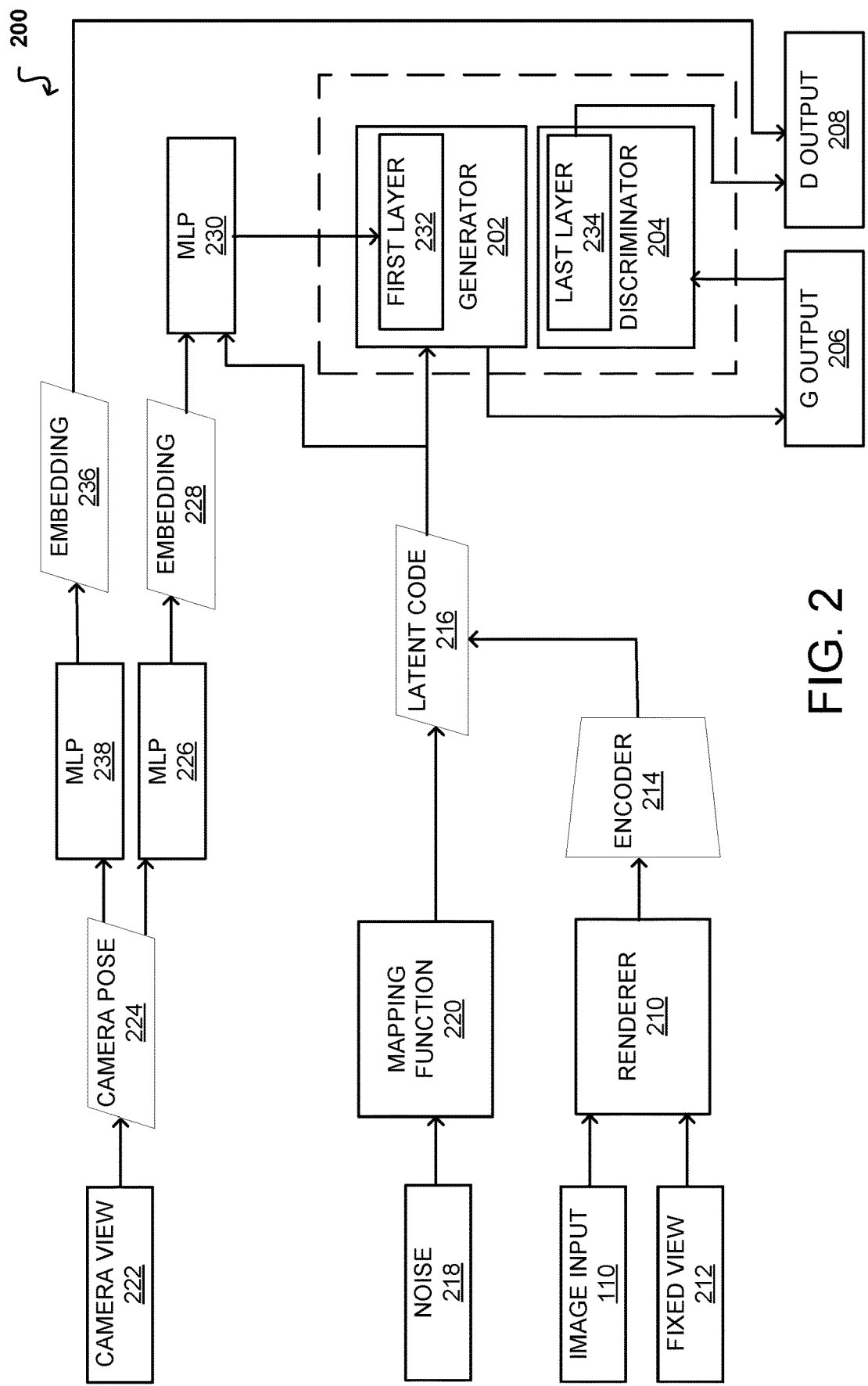
FIG. 2 illustrates a schematic diagram of an environment for content generation, according to at least one embodiment.

FIG. 2 illustrates an environment 200 representative of an architecture of a generative neural network, such as ccGAN 104. In various embodiments, more or fewer components may be included within the representative architecture, such as one or more pre- or post-processing modules, filters, tuning parameters, and/or the like. Furthermore, various components may share or otherwise operate on similar underlying hardware and/or may share one or more neural network layers. In this example, the ccGAN 104 includes a generator (G) 202 and a discriminator (D) 204 where the generator 202 generates one or more outputs 206 for review and analysis by the discriminator 204 to make a determination 208 of whether or not the output 206 is in a particular view. That is, the discriminator 204 determines whether an image produced by the generator 202 corresponds to a desired view.

The illustrated architecture includes the image input 110, which may include a 3D shape with texture, as noted herein. The image input 110 is provided to a renderer 210 along with a fixed camera view 212. The renderer 210 may generate an image and pass the image to an encoder (E) 214, which is used to jointly train the GAN. In various embodiments, the encoder 214 projects input renders into a latent space, which may be referred to as a StyleGAN latent space. The encoder 214 may be a ResNet which takes renderings of 3D objects in a fixed camera view (e.g., based on the fixed view 212), such as an orthogonal side view, as an input. Providing the input in this way avoids adding view-dependency to a generated vector (w) 216. For example, the encoder 214 may be used to generate the vector 216 corresponding to latent code corresponding to an identity of the image input 110. In this instance, the vector 216 may further include noise 218 that is passed through a mapping function (M) 220.

Further illustrated is a camera view 222 that is used to generate a conditional vector 224 of the camera view (u), associated with one or more camera extrinsics. The vector 224 is passed to both the generator 202 and discriminator 204 such that the generator 202 is able to learn to generate images in the specific view and the discriminator 204 is able to tell whether the generated images are in the right (e.g., desired) views. As discussed herein, u is embedded using a multilayer perceptron (MLP) 226 and the resulting output embedding 228 (embed(u)) is concatenated with the vector (w) 216, which may further be processed by another MLP 230. In various embodiments, a single MLP may be used to process both u and/or embed(u) or the two MLPs may share one or more components or operate on common underlying hardware. A first layer 232 of the generator 202 may receive embed(u) and/or the combination processed by the MLP 230, as a source of view information at the coarsest level. In at least one embodiment, subsequent layers will only receive the vector 216 (w) as an input. Because the vector 216 is not aware of the camera views, only the identity may be encoded, which leads to a natural disentanglement of identity and view direction. The camera pose 224 may also be passed to the output 208 from a last layer 234 after being embedded 236 as embed'(u) by an additional MLP 238. As noted herein, one or more MLPs may be used to accomplish one or more different tasks and may share one or more components with other MLPs.

Training of the ccGAN 104 shown in FIG. 2 may include randomly sampling different camera views, rendering synthetic images, and jointly training the encoder 214, the mapping function 210, the generator 202, and the discriminator 204 on synthetic images. In various embodiments, each training batch, and/or at least some of the training batches, includes images of multiple objects, and each object has two images in different camera views. Thereafter, each training iteration optimizes different modules using different combinations of losses. Such a training process may improve learning and identity-view disentanglement.

In at least one embodiment, each iteration includes three phases. A first phase, which may be referred to as a GM-phase, is used to optimize the generator 202 and the mapping function 220 with adversarial loss on images generated from the noise 218 with random view 224. During training, a loss or cost during the GM-phase may be defined as $L_{adv}(G(M(z), u))$. A second phase, which may be referred to as a D-phase, updates the discriminator 204 to distinguish real renders from both images generated from the noise 218 and images generated from the vector 216 predicted by the encoder 214. During training, a loss or cost during the D-phase may be defined as $L_{adv}(G(M)(z), u)) + L_{adv}(G(E(R)(O, \bar{u})), u))$, where O is the input 3D object, R denotes the rendering function that renders O in a fixed view $\bar{u}$, which as shown in FIG. 2, may be represented by the fixed view 212. A third phase, which may be referred to as the GE-phase, jointly updates both the generator 202 and the encoder 214 by optimizing a mean square error (MSE) reconstruction loss and a perceptual reconstruction loss between the images generated by the generator 202 and the images rendered from the renderer 210 from the same random views, and the adversarial loss for images from the encoder 214. This loss may be defined as $L_{mse}(G(E(R)(O, \bar{u})), u), R(O, u)) + L_{percep}(G(E(R)(O, \bar{u})), u), R(O, u)) + L_{adv}(G(E(R)(O, \bar{u})), u))$.

In various embodiments, weights are skipped for different loss terms and the parameters to optimize are emitted for simplification with the notation. In other embodiments, different weights may be applied to different losses. Additionally, augmentation in line with StyleGAN-ADA may be used to augment training images in color space, however, geometric augmentation may not be used in order to maintain a view-conditional setting. In at least one embodiment, R1-regulation is applied to the discriminator 204 over a set number of iterations, such as 16 training iterations.

Various embodiments may further incorporate a stylized generator (G') to produce images in unseen styles using guidance from a language-vision model. These techniques may be applied to the generator 202 to produce a generator that is able to generate multi-view consistent renders of 3D objects in a specific style, unseen in the training data. For example, the training may be performed for a fixed style, such as "zombie animal" or "cartoon features" using guidance from one or more pretrained language-vision (e.g., CLIP) models. As noted herein, random sample noise 218 and the camera views 222 may be used to drive a frozen generator and trainable generator to synthesize images in the same random identity and random view. Accordingly, directional CLIP loss may be used to learn domain shifts when incorporating G'.

Figure 3:
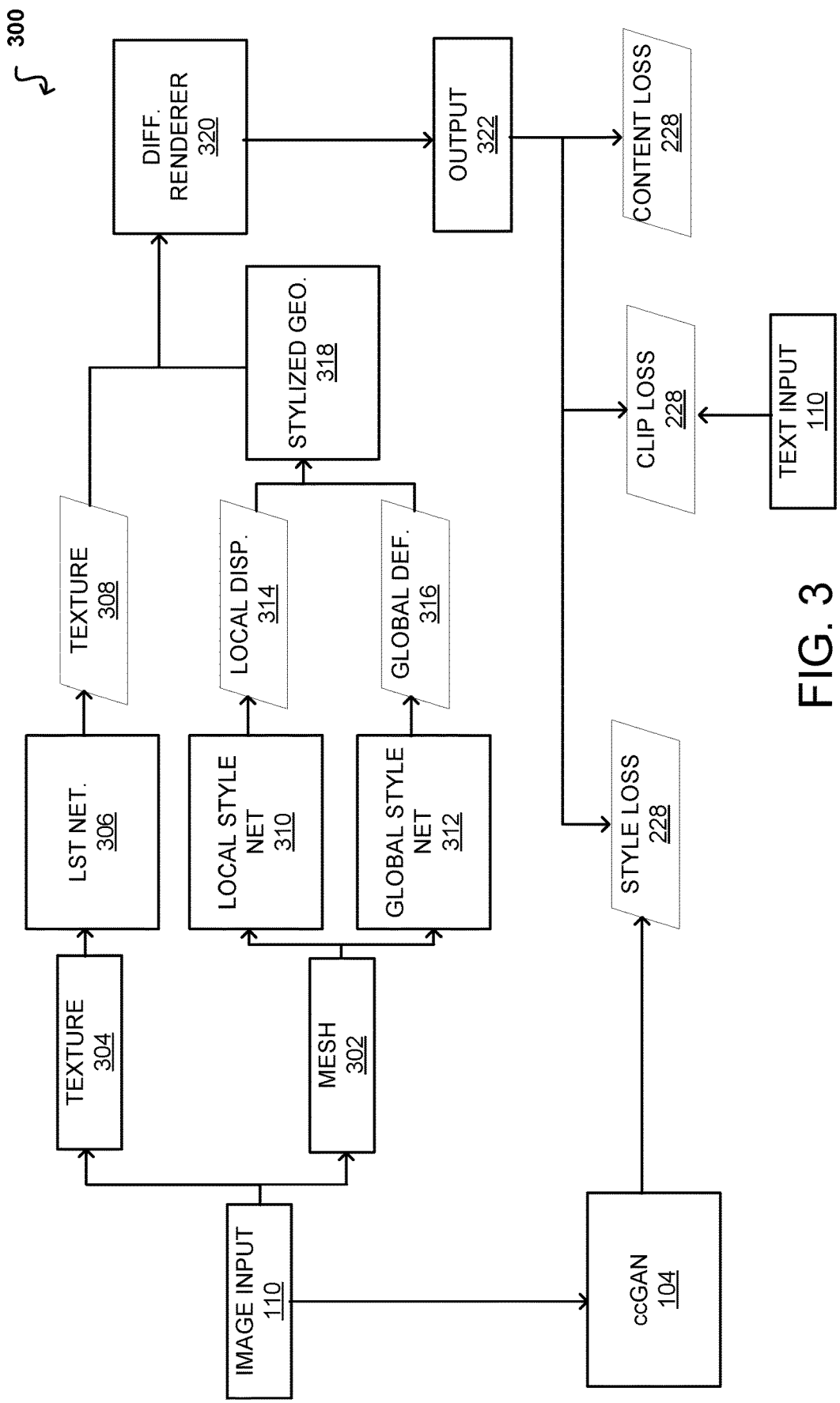
FIG. 3 illustrates a schematic diagram of an environment for content generation, according to at least one embodiment.

FIG. 3 illustrates an environment 300 representing the 3D stylization module 106 along with a generative neural network (e.g., ccGAN 104) to generate one or more losses that may be used to generate one or more images based on the image input 110 and the text input 112. In this example, the ccGAN 104 may include one or more features of FIG. 2 and, moreover, may incorporate the stylization generator in order to generate one or more outputs for evaluation by the discriminator in order to determine a loss or cost. In various embodiments, the stylization generator produces multi-view images in an unseen text-driven style that may be used to help train the 3D stylization module 106 to modify a geometry and texture of input 3D models to a style. After training, the module can be used to style new 3D meshes using the style in real or near-real time (e.g., without significant delay).

Embodiments of the present disclosure illustrate three branches used to form the 3D stylization module 106, but other embodiments may include more or fewer branches. These branches are responsible for texture style, global geometric style, and local geometric style. The texture and global geometric style branches may share one or more features of 3DStyleNet, described herein. In addition, local geometric warping is provided to enable local geometric stylization. Accordingly, the combination of these branches provides an edited textured 3D mesh which is then rendered in multiple views using a differentiable renderer to allow image-based supervision.

The image input 110 is shown as including both a 3D shape 302 (such as a 3D mesh) and a texture 304. The texture 304 may represent one or more local features of the object, such as a surface shape or size, along with colors, patterns, and/or other features. The texture 304 may be processed using a pre-trained linear image style transfer network (LST) 306 for texture image stylization. In at least one embodiment, the LST 306 sets the texture image of the 3D input mesh as its content image and then sets one randomly sampled render from the stylization generator as its style image. The LST network may then be used to adjust the input texture image such that the object rendered with the new texture is closer to the target style. At training time, the LST may be tuned using a linear transformation module under the multi-view supervision generated by the stylization generator in addition to the supervision provided by a language-vision model. As shown, the network may output a texture 308, which may also be referred to as a stylized texture.

The geometric stylization architecture of the illustrated embodiment may take the form of evaluating both a local style and a global style. Local style may refer to a local texture or surface roughness, among other options. For example, a local style may refer to how long fur is for an animal or how rough a surface appears. In contrast, global style may refer to an overall appearance. By way of example, a global style may correspond to a theme, such as a cartoon, where features may be exaggerated (e.g., larger eyes, larger head) for a particular style when compared to another. While both may refer to geometric features of the 3D object, each of these styles may adjust different parameters of the output provided by a renderer.

In at least one embodiment, a local style network 310 and a global style network 312 may correspond to an MLP with positional encoding and to a pretrained 3DStyleNet geometric branch, respectively. These networks 310, 312 may then be used to address mesh deformation when adjusting the input image in accordance with the instructions associated with a textual input. For example, one or more pretrained networks may be used on different sets of untextured meshes to output a part-aware deformation parameterized on a set of ellipsoids. At training time, the last layer of the deformation network may be tuned to adopt to one or more set domains. For the local style network 310, the MLP may be trained to learn per-vertex displacement along a normal direction. In at least one embodiment, input points may be five-dimensional (5D) to correspond to xyz coordinates of vertices, along with their UV coordinates. Aligning UV coordinates may facilitate learning of consistent local warping.

An output associated with the local style network 310 may correspond to local displacements 314, such as surface roughness, fur length, and/or the like, while an output associated with the global style network 312 may correspond to larger global deformations 316, such as changes in head shape for an object, as an example. Features from each of these outputs 314, 316 may be used to develop a total stylized geometry 318, which may be passed along with the texture 308 to a differentiable renderer 320. An output 322 of the differential renderer 320 may correspond to one or more images of the object having a modified shape and/or texture.

As noted with respect to the ccGAN 104, various embodiments generate a loss or cost associated with the output 322. In this example, losses may be generated with respect to content, CLIP, and style. For example, certain embodiments may train the texture branch (e.g., the LST 306) and the geometric metric (e.g., the local and global networks 310, 312) alternately. However, other embodiments may train them at the same time. In at least one embodiment, even iterations train the LST 306 by optimizing a texture loss function defined as $L_{texture}=L_{content}+\lambda_1 L_{style}+\lambda_2 L_{perceptural}+\lambda_3 L_{clip}$, where $L_{content}$ is the visual geometry group (VGG) content loss defined between the multi-view renderings of stylized mesh and the multi-view renderings of the original mesh, which may be obtained through Nvdiffrast. $L_{style}$ is the VGG style loss defined between the multi-view stylized generator renderings and the multi-view renderings of the stylized mesh. $L_{perceptual}$ is the perceptual loss in VGG feature space measuring the difference between the stylized rendering from the stylized renderer and the stylized rendering from the stylized mesh by Nvdiffrast. $L_{clip}$ is the cosine distance loss defined between CLIP embeddings of the multi-view renderings of the stylized mesh and the CLIP embeddings of augmented text input. The weights may be tuned or adjusted based on operating parameters, but in at least one embodiment, the weights may be tuned as 0.1, 10, and 100.0, respectively.

While various embodiments may train the branches together, in embodiments where branches are trained alternately, during odd iterations the global and local geometric networks 310, 312 may be trained by optimizing a geometric loss function defined as $L_{geometry}=L_{mask}+\alpha(L_{texture}+L_{content})$, where $L_{mask}$ measures the MSE between the multi-view masks of the stylized mesh, and the masks of the GAN renderings (which may be obtained by thresholding images with a white background). Also provided within the loss function is the texture loss as part of the geometric loss. This is because updating the geometry may warp textures, which would result in texture style changes. As shown, the content loss is subtracted to prevent geometric deformation. In this example, weights may further be adjusted based on operating parameters, but a default value may be set as 1e-4 in at least one embodiment because the mask loss may be significantly smaller than the texture loss.

The 3D stylization module 106 may be trained on a collection of textured 3D object meshes in which the textures are aligned in their UV image plane, resulting in consistent inputs for learning texture stylization. Training over these shapes may be guided by multi-view renderings produced by the stylized generator given the encoding of rendered training shapes into the vector 216 using the pre-trained encoder 214 described with respect to the ccGAN 104. In various embodiments, the same set of shapes is used as for training the generator 302 and the encoder 214.

Figure 4:
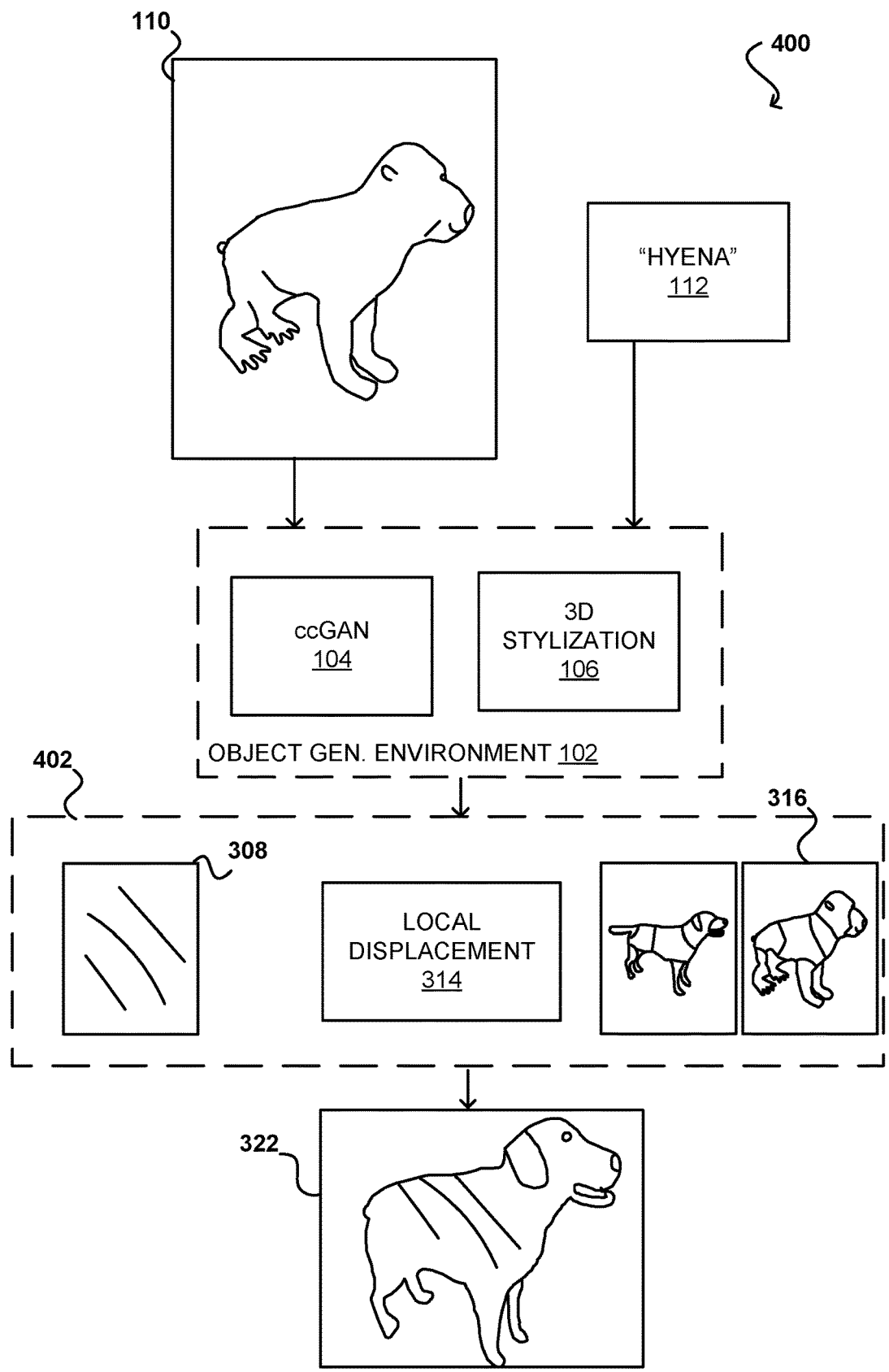
FIG. 4 illustrates an example content generation procedure, according to at least one embodiment.

FIG. 4 illustrates an example image generation procedure 400 that may be used with embodiments of the present disclosure. In this example, the input image 110 is provided as a 3D shape with texture, which in this example includes an image of a gorilla and details regarding texture such as fur color, fur roughness, and/or the like. The 3D image is provided to the object generation environment 102, which includes the ccGAN 104 and the 3D stylization module 106, along with a text input 112 to drive changes to the input image 110. In this example, the text input 112 is "hyena," which would direct the object generation environment 102 to generate one or more images such that the gorilla in the input image 110 is morphed or otherwise changed to include one or more characteristics of a hyena.

In at least one embodiment, the ccGAN 104 is used to supervise learning of the 3D stylization module 106 to extract one or more features 402 associated with the input image 110 that may then be adjusted or otherwise changed based on parameters associated with the text input 102. For example, the texture 308 may be associated with a striped coat for the hyena, the local displacement 314 may include lengthening the fur, and the global deformation 316 may compare features of the gorilla against those of a hyena in order to morph or otherwise adjust the 3D mesh associated with the input image 110 to generate the output 322. In this example, the output 322 has applied the texture 308 to the image, and has also adjusted certain features, like adding different ears, changing the legs, and the like to morph the gorilla of the input to appear more like a hyena.

Figure 5A:
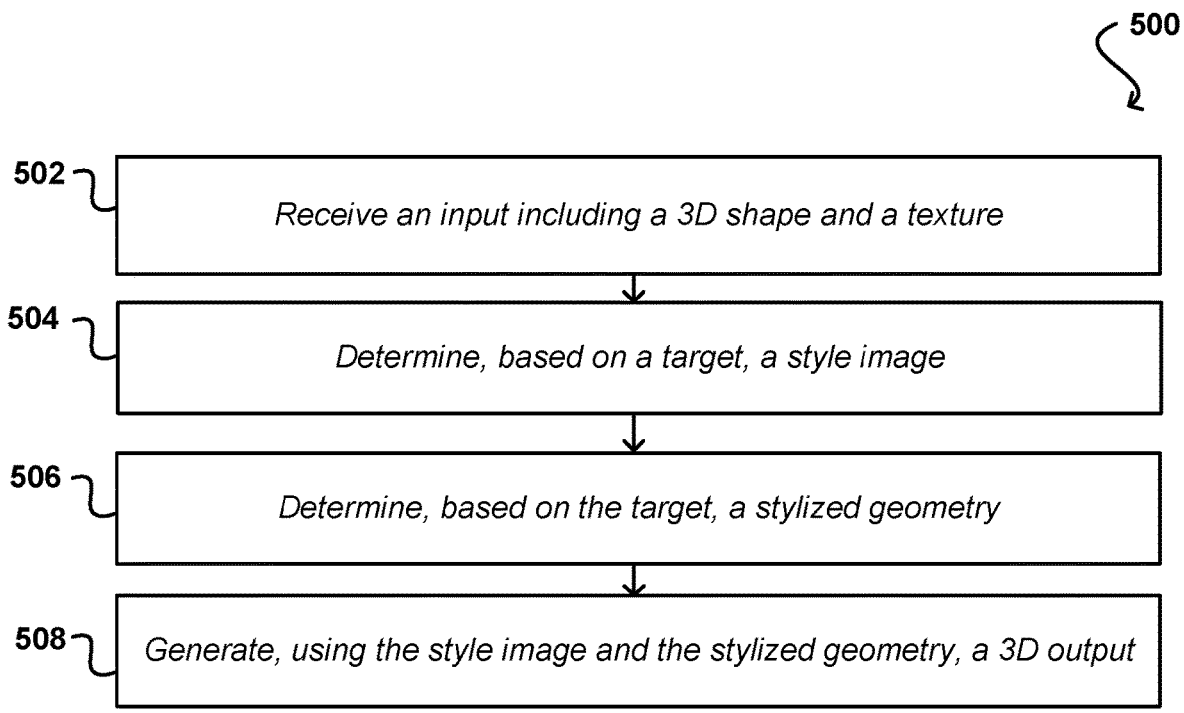
FIG. 5A illustrates an example process for generating a stylized three-dimensional (3D) object, according to at least one embodiment.

FIG. 5A illustrates an example process 500 for generating a stylized 3D object model. It should be understood that for this and other processes presented herein that there can be additional, fewer, or alternative steps performed in similar or alternative order, or at least partially in parallel, within scope of various embodiments unless otherwise specifically stated. In this example, an input is received that includes a 3D shape and a texture 502. For example, the input may be a rendered 3D object, such as a computer-generated object. The input may be evaluated using one or more trained machine learning systems in order to determine a style image based on a target 504. The style image may determine features associated with the texture, such as its appearance, certain characteristics, and/or the like. Furthermore, the trained network may use that information in order to generate a stylized texture associated with the style image.

In at least one embodiment, a stylized geometry is determined based on the target 506. The stylized geometry may include components for both local and global displacements. For example, local displacements may correspond to surface roughness or point maps, while global displacements may correspond to larger scale deformations. In combination, each of these features may be used to generate a stylized geometry to morph or otherwise adjust the input. In at least one embodiment, a 3D output is generated using the style image and the stylized geometry 508. For example, features of the input image may be skewed or adjusted, such as by changing certain shapes or adding different textures of appearances to the input image, in order to get a new 3D object that corresponds to one or more features of the target.

Figure 5B:
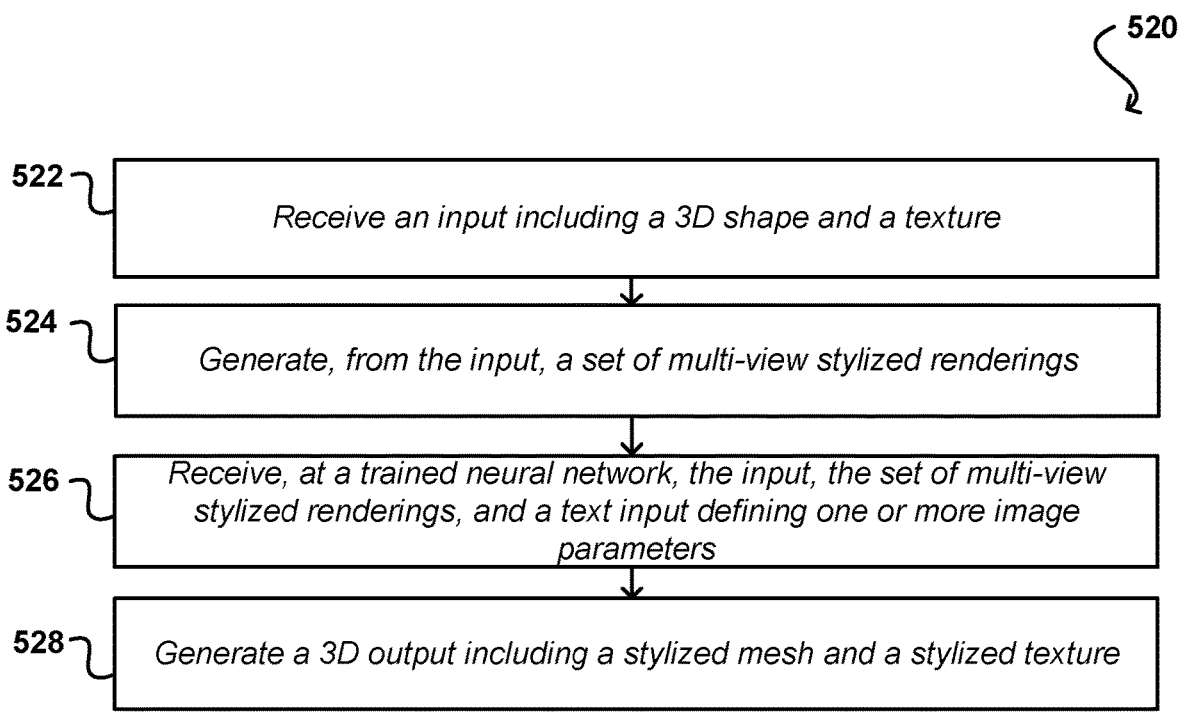
FIG. 5B illustrates an example process for generating a stylized three-dimensional (3D) object, according to at least one embodiment.

FIG. 5B illustrates an example process 520 for generating a stylized 3D object model. In this example, an input is received 522. As noted herein, the input may be a 3D object that includes a 3D shape, such as a mesh, and a texture. The input may be used to generate a set of multi-view stylized renderings 524. For example, a trained machine learning system may include an encoder and generator that, based at least on a camera view, generate a series of images corresponding to the input, where one or more features are adjusted based on a target. In at least one embodiment, the multi-view renderings are provided to a trained neural network along with the input and a text input 526. The text input may define one or more parameters of an adjust to the input, such as setting a certain style. Using the text input, a 3D output may be generated that includes a stylized mesh and a stylized texture, where each of the mesh and texture are based on the text input.

Figure 6:
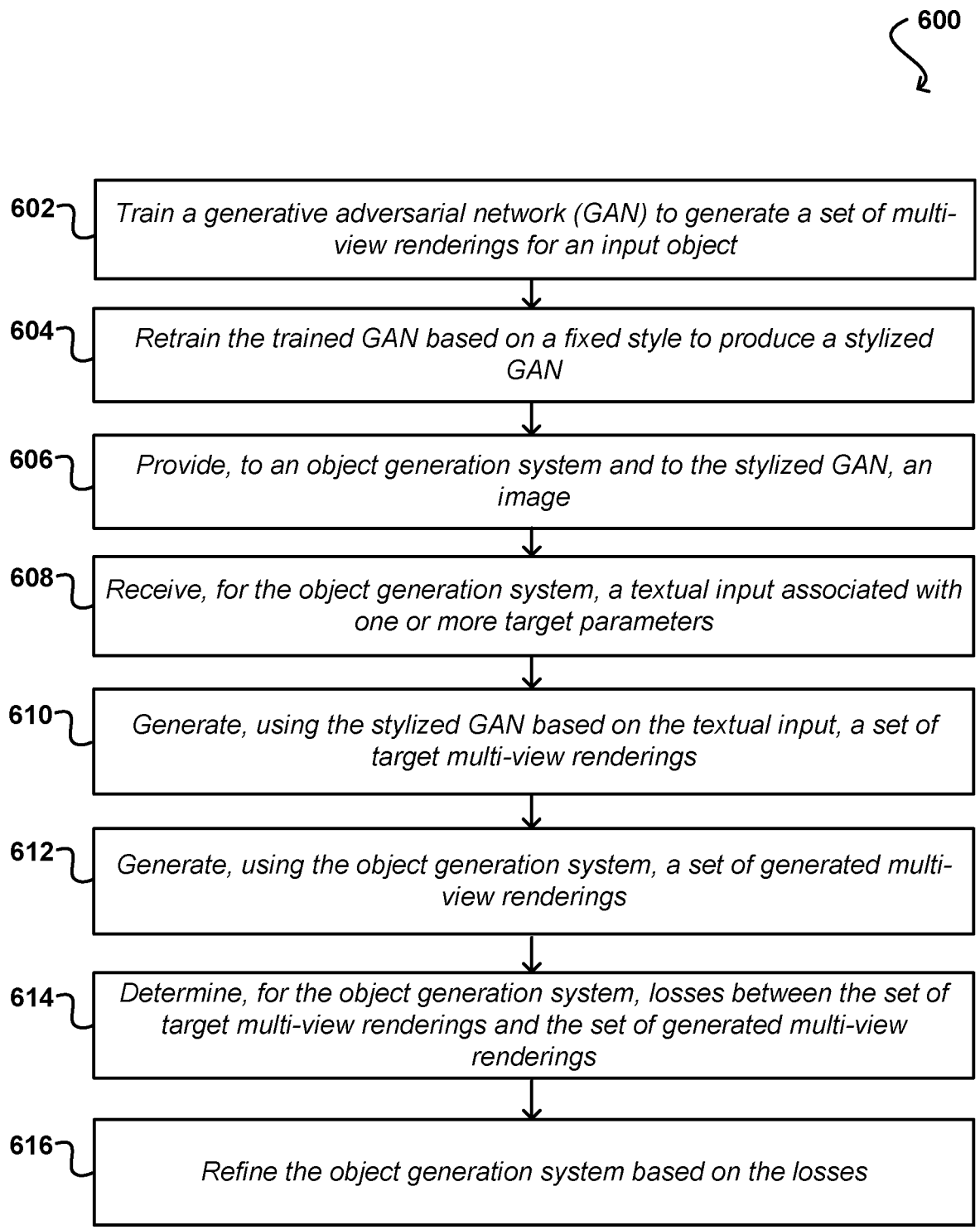
FIG. 6 illustrates an example process for training an object generation system, according to at least one embodiment.

FIG. 6 illustrates an example process 600 for training an object generation system. In this example, a GAN is trained to generate a set of multi-view renderings for an input object 602. For example, the GAN may be trained based on different camera views in order to receive a camera vector and an object and then produce a set of images have a different orientation, with respect to the camera, than the input object. The GAN may then be retrained based on a fixed style to produce a stylized GAN 604. In at least one embodiment, the stylized GAN may include a stylized generator that is used to generate additional images that not only adjust a view of an input object, but also changes an appearance of the object.

Various embodiments may provide an image to the object generation system and the stylized GAN 606. The image may include both a 3D mesh and texture. The object generation system may receive a textual input associated with one or more target parameters for generated objects 608. In at least one embodiment, the textual input may be compared to a database that is used to extract specific features associated with the textual input. However, in other embodiments, the textual input is used to direct the object generation system to modify or otherwise adjust different features of an input.

Using the stylized GAN, a set of target multi-view renderings may be generated 610 along with a set of generated multi-view renderings from the object generation system 612. These sets of renderings may then be compared and evaluated for differences or losses, which may be used to develop a loss for the object generation system 614. This loss, or losses, may then be used to refine the object generation system 616.

Data Center

Figure 7:
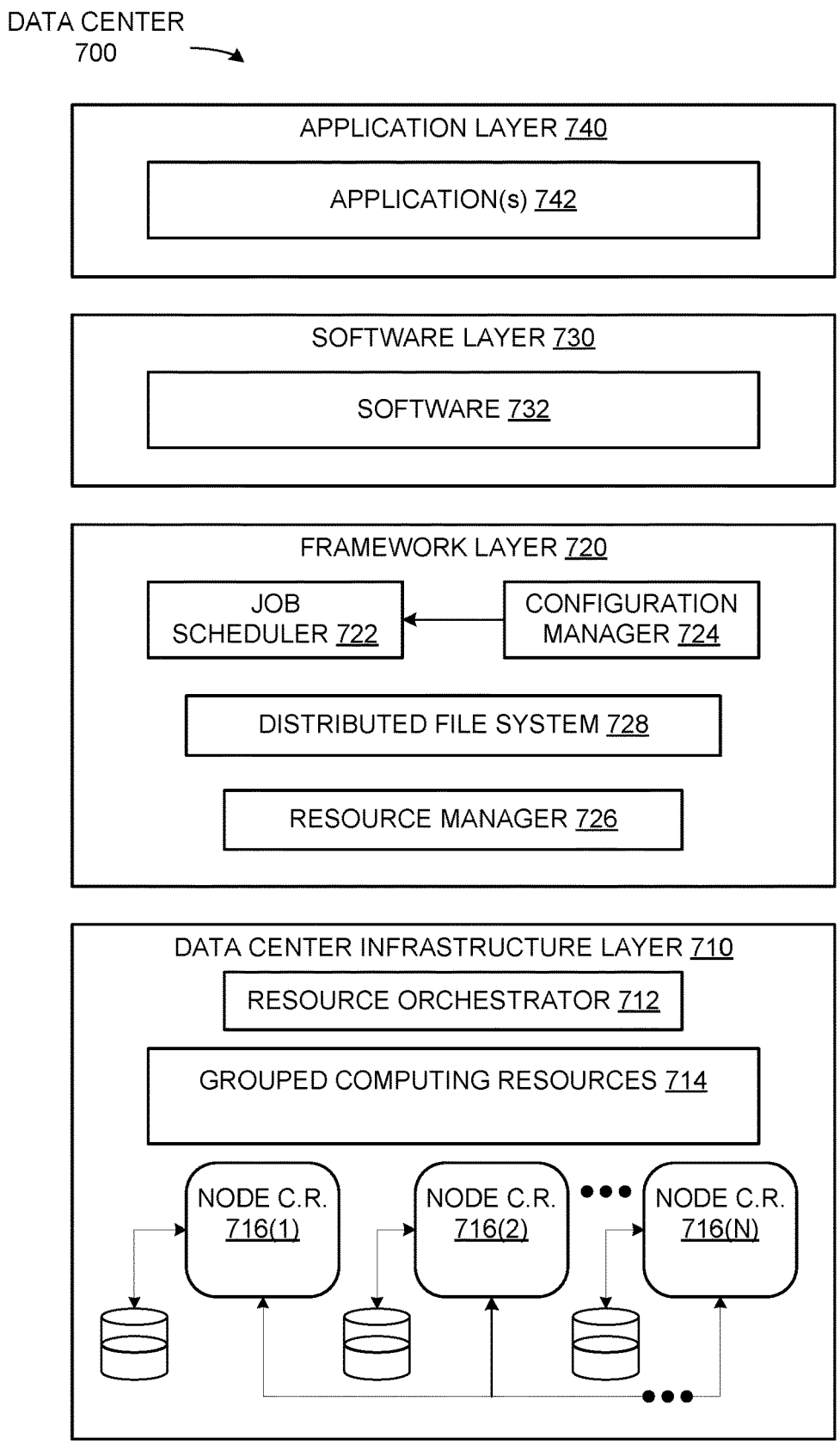
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may use distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underused and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for 3D object generation.

Computer Systems

Figure 8:
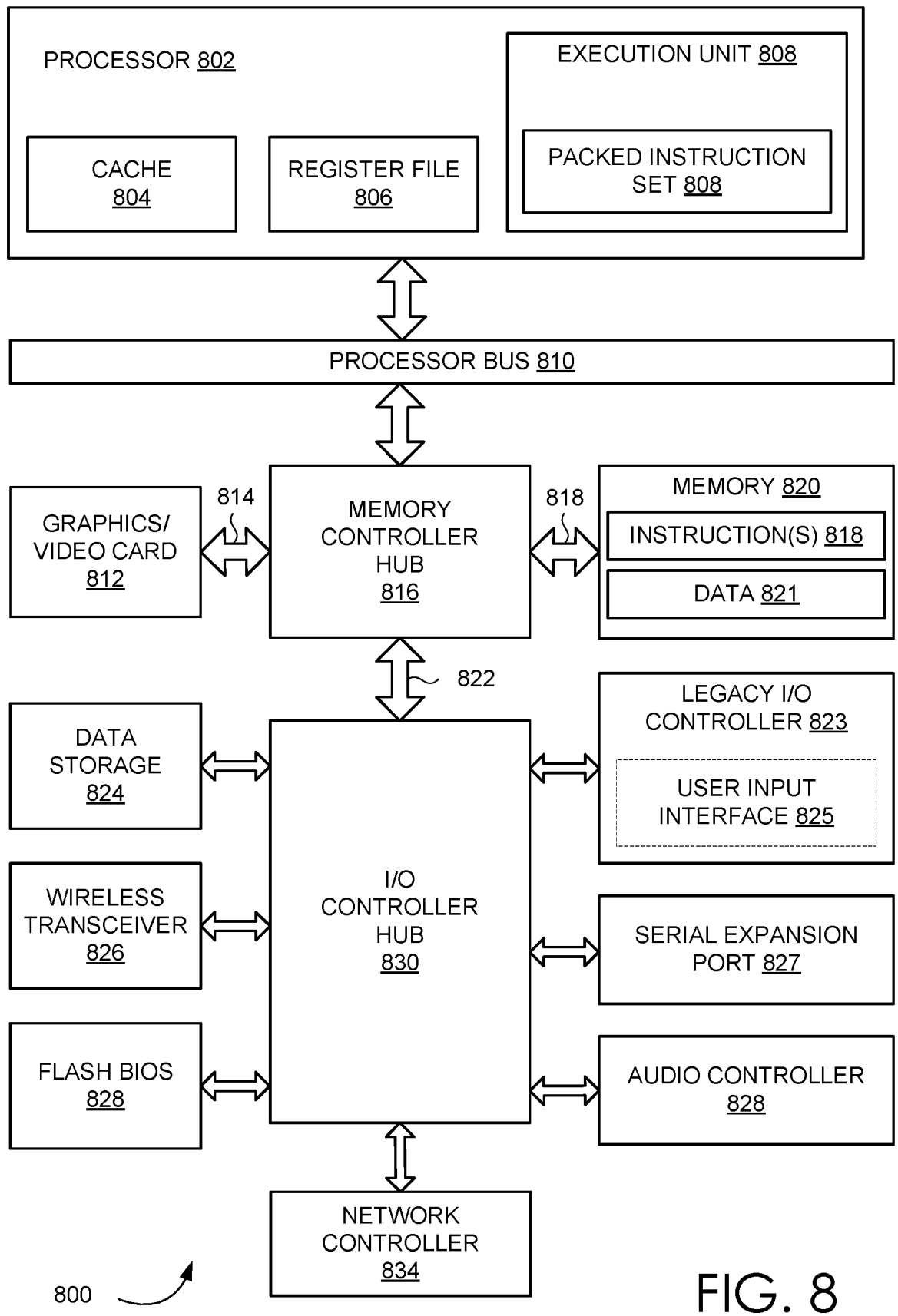
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium® XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

Embodiments of the systems and methods described herein may be used for a variety of purposes, by way of example and without limitation, for machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be incorporated or integrated in a variety of different systems such as automotive systems (e.g., a human-machine interface for an autonomous or semi-autonomous machine), systems implemented using a robot, aerial systems, medial systems, boating systems, smart area monitoring systems, systems for performing deep learning operations, systems for performing simulation and digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for 3D object generation.

Figure 9:
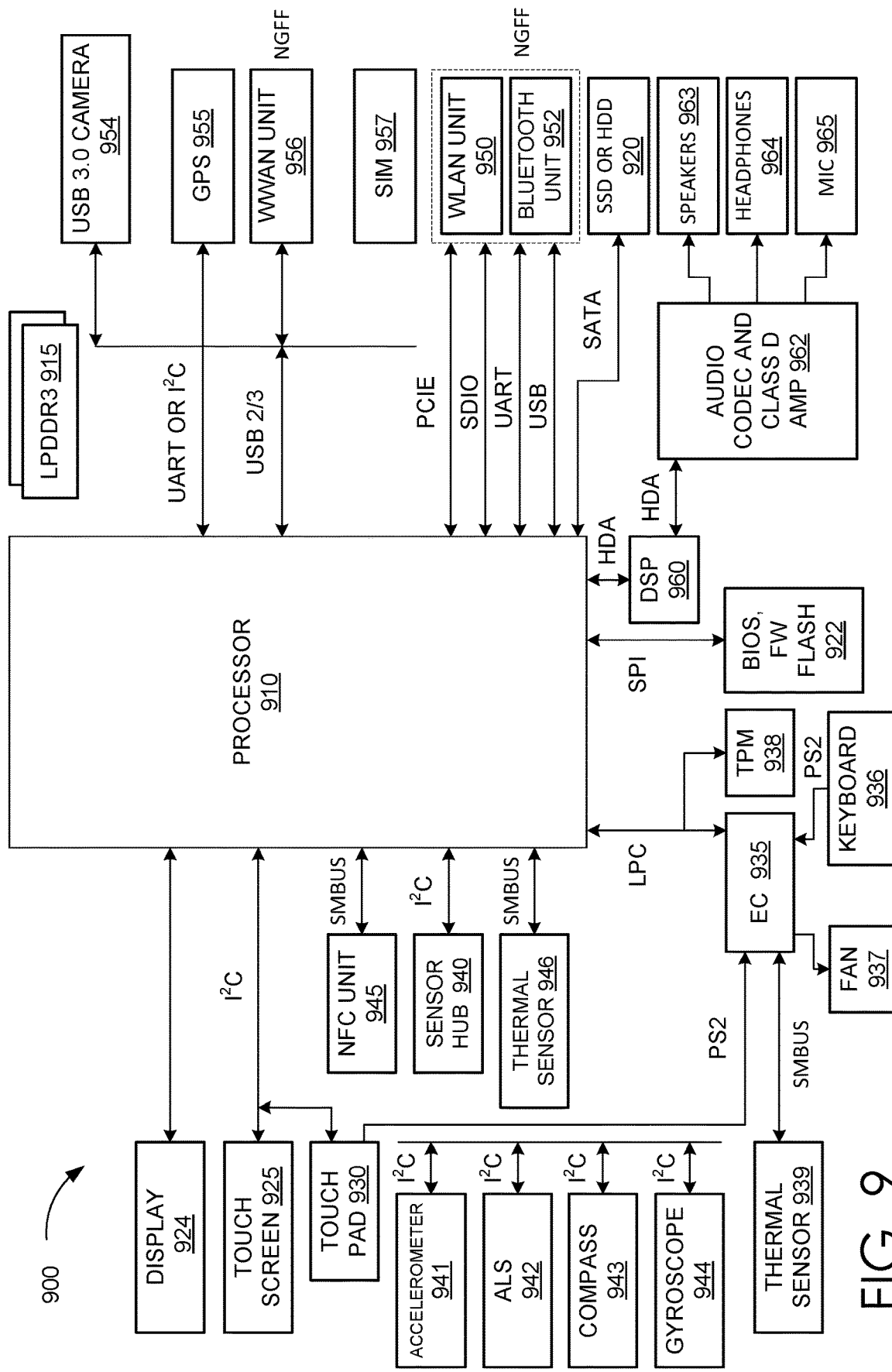
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for 3D object generation.

Figure 10:
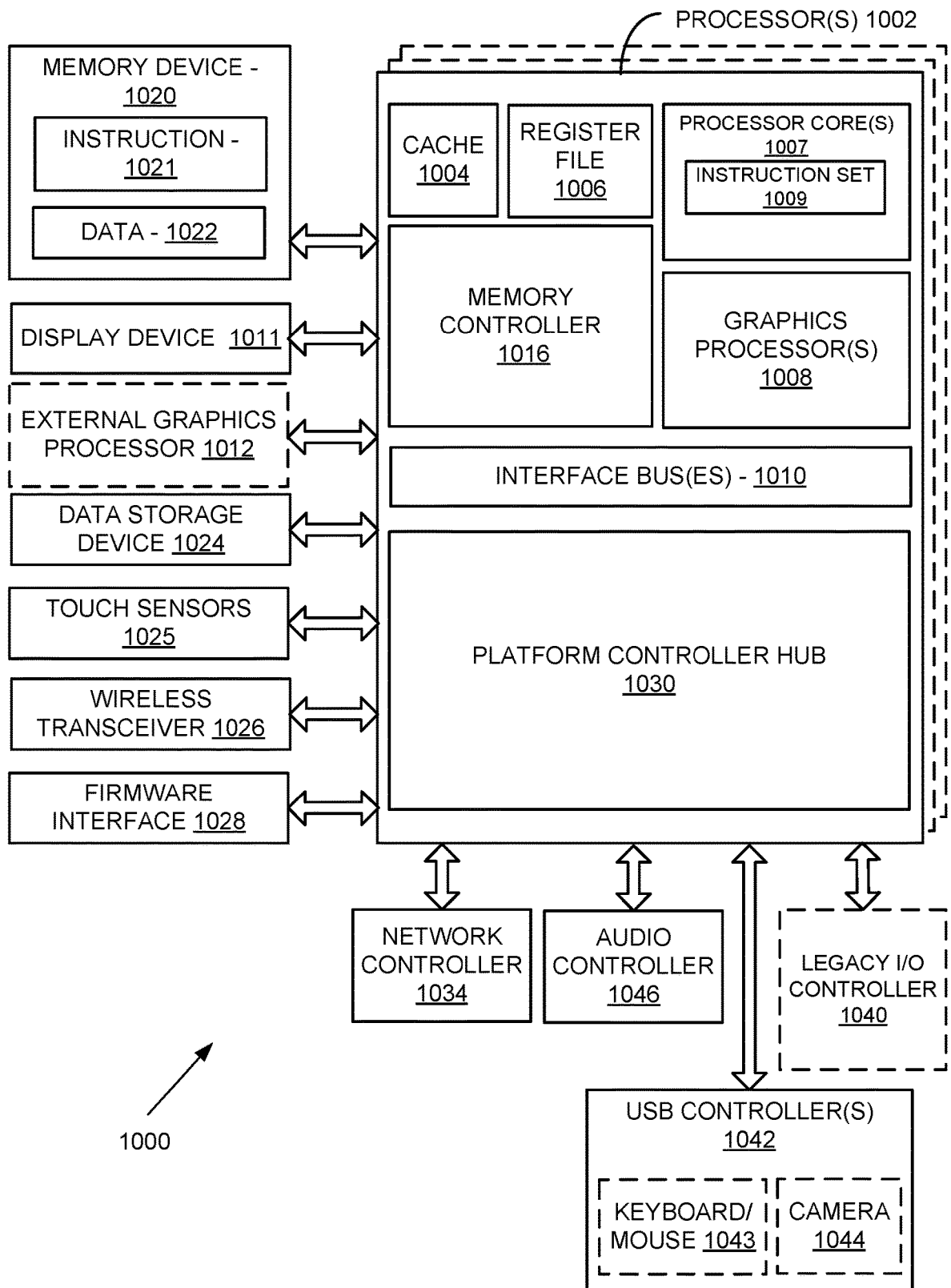
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for 3D object generation.

Figure 11:
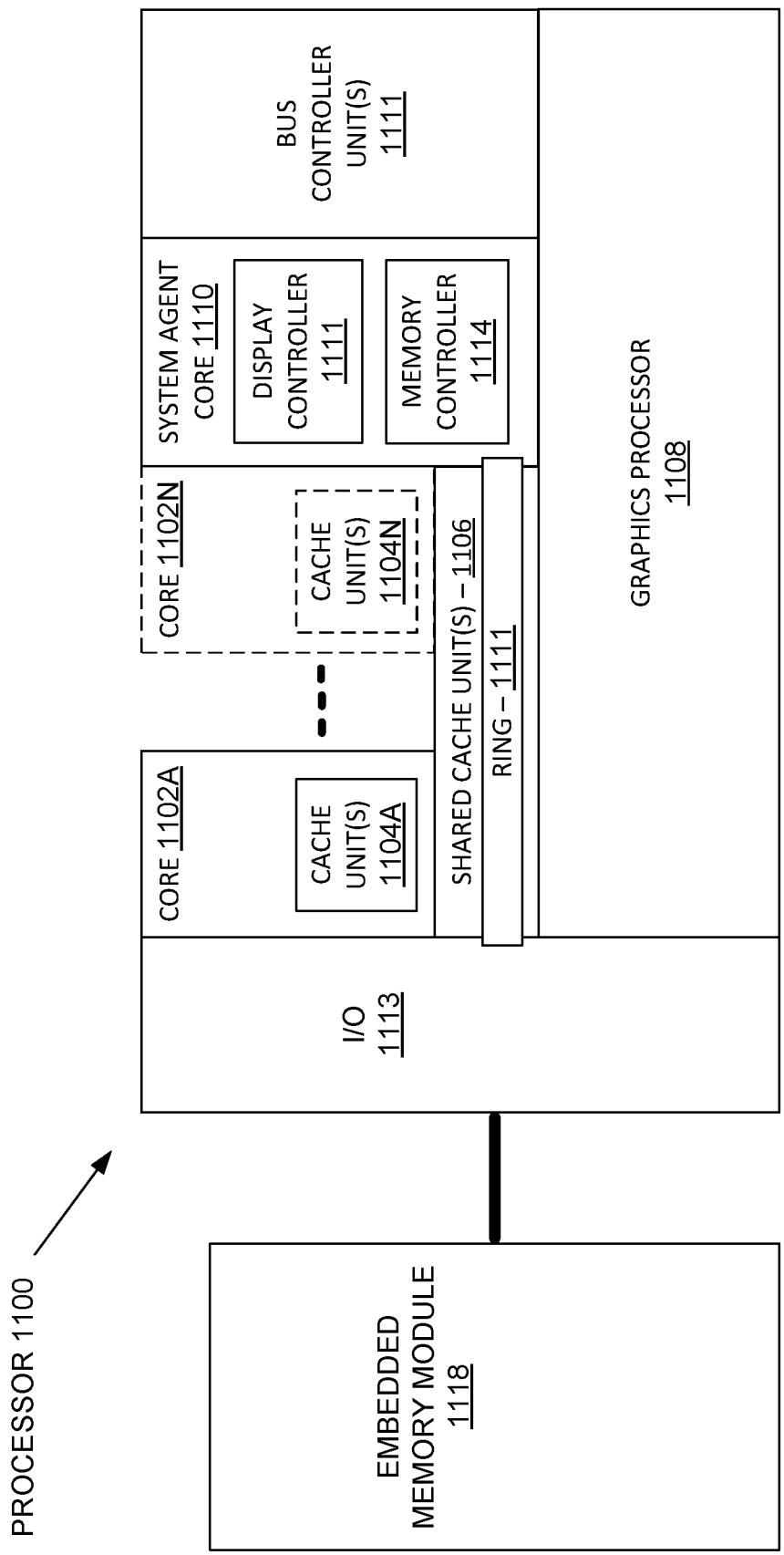
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for 3D object generation.

Various embodiments can be described by the following clauses:

1. A computer-implemented method, comprising:
   receiving an input indicating a three-dimensional (3D) shape and a texture;
   determining, using a neural network, a style image based at least on a target style and the texture;
   determining, using the neural network, a local displacement based at least on the 3D shape and a target geometry;
   determining, using the neural network, a global deformation based at least on the 3D shape and the target geometry;
   generating, using the local displacement and the global deformation, a stylized geometry; and
   generating an output including an output 3D shape and an output texture based at least on the stylized geometry and the target style.

2. The computer-implemented method of clause 1, further comprising:
   receiving one or more camera properties corresponding to one or more camera views; and
   generating, using a second neural network, a set of multi-view renderings based at least on the input and the one or more camera properties.

3. The computer-implemented method of clause 2, further comprising:
   determining a first loss between a textual input and the output;
   determining a second loss between the stylized geometry and the 3D shape of the input; and
   determining a third loss between the stylized geometry and the set of multi-view renderings.

4. The computer-implemented method of clause 1, wherein the neural network is associated with a textual input to define at least one of the target geometry and the target style.

5. The computer-implemented method of clause 1, wherein the neural network is jointly trained with a generative network, the generative network comprising at least one of: a generative adversarial network, an autoencoder network, a transformer network, or a diffusion network.

6. The computer-implemented method of clause 1, wherein local displacement corresponds to at least one of a surface roughness, geometric surface details, or a bump map.

7. The computer-implemented method of clause 1, wherein global deformation corresponds to an object shape.

8. A system, comprising:
   one or more processors to use a neural network to generate a three-dimensional (3D) output including a stylized mesh and a stylized texture, based in part upon an input 3D mesh, an input texture, a set of multi-view stylized renderings generated using the input 3D mesh and input texture, and a text input defining one or more parameters of the neural network.

9. The system of clause 8, wherein the system is comprised in at least one of:
   a human-machine interface system of an autonomous or semi-autonomous machine;
   a system for performing conversational AI operations;
   a system for generating or presenting at least one of augmented reality content, virtual reality content, or mixed reality content;
   a system for performing simulation operations;
   a system for performing digital twin operations;
   a system for performing deep learning operations;
   a system implemented using an edge device;
   a system implemented using a robot;
   a system incorporating one or more virtual machines (VMs);
   a system implemented at least partially in a data center; or
   a system implemented at least partially using cloud computing resources.

10. The system of clause 8, wherein the set of multi-view stylized renderings are based at least on one or more camera parameters.

11. The system of clause 8, wherein the neural network includes a first branch and the first branch determines the stylized texture based at least on the text input.

12. The system of clause 8, wherein the trained neural network includes a second branch and a third branch, and the second branch and the third branch determine a stylized geometry based at least on the text input.

13. The system of clause 12, wherein the second branch corresponds to local geometric displacement and the third branch corresponds to global geometric deformations.

14. The system of clause 8, wherein the one or more processors further determine a cost between the set of multi-view stylized renderings and the 3D output.

15. The system of clause 14, wherein one or more parameters of the cost may be adjusted using a set of weights.

16. A processor, comprising:
   one or more processing units to:
   generate, using a generative adversarial network (GAN, a set of multi-view renderings of an input object;
   provide, to a neural network, the set of multi-view renderings;
   receive, at the neural network, the input object, the neural network associated with parameters of a textual input;
   determine, from the input object, an object texture and an object mesh;
   generate, using the set of multi-view renderings as supervision with the trained neural network, a final object output.

17. The processor of clause 16, wherein the one or more processing units are further to:
  determine a set of losses between the set of multi-view renderings and an intermediate set of stylized renderings; and
  refine the neural network based at least on the set of losses.
18. The processor of clause 16, wherein the object mesh includes a combination of local geometry and global geometry.
19. The processor of clause 16, wherein the input object is a three-dimensional mesh with texture.
20. The processor of clause 16, wherein the processor is comprised in at least one of:
  a human-machine interface system of an autonomous or semi-autonomous machine;
  a system for performing conversational AI operations;
  a system for generating or presenting at least one of augmented reality content, virtual reality content, or mixed reality content;
  a system for performing simulation operations;
  a system for performing digital twin operations;
  a system for performing deep learning operations;
  a system implemented using an edge device;
  a system implemented using a robot;
  a system incorporating one or more virtual machines (VMs);
  a system implemented at least partially in a data center; or
  a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
receiving an input indicating a three-dimensional (3D) shape and a texture;
generating, using a first neural network, a set of multi-view renderings based at least on the input and one or more camera properties corresponding to one or more camera views;
determining, using a second neural network, a style image based at least on a target style and the texture;
determining, using the second neural network, a local displacement based at least on the 3D shape and a target geometry;
determining, using the second neural network, a global deformation based at least on the 3D shape and the target geometry;
generating, using the local displacement and the global deformation, a stylized geometry;
generating an output including an output 3D shape and an output texture based at least on the stylized geometry and the target style;
determining a first loss between a textual input and the output;
determining a second loss between the stylized geometry and the 3D shape of the input; and
determining a third loss between the stylized geometry and the set of multi-view renderings.

2. The computer-implemented method of claim 1, wherein the textual input defines at least one of the target geometry or the target style.

3. The computer-implemented method of claim 1, wherein the second neural network is jointly trained with a generative network, the generative network comprising at least one of: a generative adversarial network, an autoencoder network, a transformer network, or a diffusion network.

4. The computer-implemented method of claim 1, wherein the local displacement corresponds to at least one of a surface roughness, geometric surface details, or a bump map.

5. The computer-implemented method of claim 1, wherein the global deformation corresponds to an object shape.

6. A system, comprising:
one or more processors to use a neural network to generate a three-dimensional (3D) output including a stylized mesh and a stylized texture, based in part upon an input 3D mesh, an input texture, a set of multi-view stylized renderings generated using the input 3D mesh and input texture, and a text input defining one or more parameters of the neural network, wherein the neural network includes a multi-branch pipeline including a first branch associated with a texture alternately trained using a first loss corresponding to a combination of losses associated with the set of multi-view stylized renderings and a second set of multi-view renderings associated with the input 3D mesh, and a second branch associated with a geometric loss trained using a second loss corresponding to losses associated with geometries of the stylized mesh and the stylized texture.

7. The system of claim 6, wherein the system is comprised in at least one of:
a human-machine interface system of an autonomous or semi-autonomous machine;
a system for performing conversational AI operations;
a system for generating or presenting at least one of augmented reality content, virtual reality content, or mixed reality content;
a system for performing simulation operations;
a system for performing digital twin operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

8. The system of claim 6, wherein the set of multi-view stylized renderings are based at least on one or more camera parameters.

9. The system of claim 6, wherein the first branch determines the stylized texture based at least on the text input.

10. The system of claim 6, wherein the neural network includes the second branch and a third branch, and the second branch and the third branch determine a stylized geometry based at least on the text input.

11. The system of claim 10, wherein the second branch corresponds to local geometric displacement and the third branch corresponds to global geometric deformations.

12. The system of claim 6, wherein the one or more processors further determine a cost between the set of multi-view stylized renderings and the 3D output.

13. The system of claim 12, wherein one or more parameters of the cost may be adjusted using a set of weights.

14. A processor, comprising:
one or more processing units to:
generate, using a generative adversarial network (GAN), a set of multi-view renderings of an input object for one or more camera views;
receive, at a multi-branch neural network, the input object, the set of multi-view renderings, and a textual input associated with one or more image parameters;
determine, from the input object, an object texture using a first branch of the multi-branch neural network and an object mesh using a second branch of the multi-branch neural network associated with local displacement and a third branch of the multi-branch neural network associated with global deformation; and
generate, using the set of multi-view renderings as supervision, a final object output, based at least on a first loss associated with the first branch and a second loss associated with the second branch and the third branch, wherein the first loss and the second loss are used to train the neural network.

15. The processor of claim 14, wherein the one or more processing units are further to:
determine the first loss between the set of multi-view renderings and an intermediate set of stylized renderings;
determine the second loss between a stylized geometry of the final object output and the object mesh;
determine a third loss between the stylized geometry of the final object and the set of multi-view renderings; and
refine the neural network based at least on the first loss, the second loss and the third loss.

16. The processor of claim 14, wherein the object mesh includes a combination of local geometry and global geometry.

17. The processor of claim 14, wherein the input object is a three-dimensional mesh with texture.

18. The processor of claim 14, wherein the processor is comprised in at least one of:
a human-machine interface system of an autonomous or semi-autonomous machine;
a system for performing conversational AI operations;
a system for generating or presenting at least one of augmented reality content, virtual reality content, or mixed reality content;
a system for performing simulation operations;
a system for performing digital twin operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

* * * * *